(12) United States Patent
Viswanathan et al.

(10) Patent No.: US 7,302,796 B2
(45) Date of Patent: Dec. 4, 2007

(54) HYDRAULIC BRAKE BOOSTER

(75) Inventors: Malaiappan Viswanathan, Chennai (IN); T Dharmar, Chennai (IN); R Srinivasa Rao, Chennai (IN)

(73) Assignee: Brakes India Limited, Chennai, Tamil Nadu (IN)

( * ) Notice: Subject to any disclaimer, the term of this patent is extended or adjusted under 35 U.S.C. 154(b) by 0 days.

(21) Appl. No.: 11/281,315

(22) Filed: Nov. 16, 2005

(65) Prior Publication Data
US 2006/0123776 A1   Jun. 15, 2006

(30) Foreign Application Priority Data
Nov. 17, 2004   (IN) .................................... 1204/04

(51) Int. Cl.
*B60T 13/14*   (2006.01)
*B60T 13/10*   (2006.01)

(52) U.S. Cl. ....................................................... 60/413
(58) Field of Classification Search ................... 60/413
See application file for complete search history.

(56) References Cited
U.S. PATENT DOCUMENTS

| | | | | |
|---|---|---|---|---|
| 3,889,467 A | * | 6/1975 | Huffman et al. ............... | 60/548 |
| 4,655,512 A | * | 4/1987 | Leiber ...................... | 303/113.4 |
| 4,732,429 A | * | 3/1988 | Belart et al. ............. | 303/114.1 |
| 5,558,002 A | * | 9/1996 | Robbins et al. ............... | 91/378 |
| 5,715,680 A | * | 2/1998 | Kruckemeyer et al. ....... | 60/552 |
| 2005/0121973 A1 | * | 6/2005 | Matsuno et al. ......... | 303/114.1 |

* cited by examiner

*Primary Examiner*—Thomas E Lazo
(74) *Attorney, Agent, or Firm*—Merchant & Gould P.C.

(57) ABSTRACT

An hydraulic brake booster for an automobile hydraulic system comprising of a boost cylinder, a boost piston and a boost chamber defined by a boost piston working in a bore in a body and being adapted to apply an output force to an output rod in response to a pressure applied to a boost chamber under a control valve, in turn responsive to an input force from input rod, wherein the input rod move in a forward operating direction up to a prescribed point so as to prevent fluid from a radial high pressure supply port from entering the boost chamber when the booster is in an inoperative position, any added movement of the input rod in a forward operating direction lifts the boost piston ball and uncovers the supply port so as to allow pressurized fluid into the boost chamber from the accumulator.

9 Claims, 10 Drawing Sheets

HYDRAULIC BRAKE BOOSTER

FIELD OF INVENTION

The present invention belongs to the field of automobile technology and relates to a mechanical invention consisting of a hydraulic booster brake system that utilizes pre-stored high hydraulic pressure generated from a hydraulic pump to produce output force corresponding to a desired brake application. More particularly the invention relates to a hydraulic booster in which an input rod moved by an input force applied to the pedal rod by an operator to regulate the flow of pressurized fluid from a source to a boost chamber. The regulated pressurized fluid acts on the boost piston to provide an operational force that moves pistons in the master cylinder to pressurize fluid that is supplied to wheel brakes, which in turn moves the brake shoes to effect a brake application.

BACKGROUND OF INVENTION

A conventional hydraulic brake booster operates in three different modes namely rest mode, apply mode and hold mode. In conventional booster assembly during rest mode boost cavity is connected to outlet port and pump port is directly connected to steering port and no pressurized fluid is supplied to boost cavity and is maintained at atmospheric pressure. The boost cavity is directly connected to the outlet port and accumulator is charged on steering application. During apply mode i.e. when the pedal is operated by the driver the input rod moves the spool valve to close the reservoir port and the steering port. The pump port opens into the boost cavity and pressurized fluid is supplied to boost cavity. The hydraulic pressure generated behind a piston is used to generate boost force. During hold mode i.e. when the driver retains the pedal in same position the boost piston is moved towards left and lever is rotated about the eccentric sleeve and as a result spool valve moves towards right and the ports to boost cavity are closed.

In the hydraulic boosters that are hitherto available in the market, the high-pressure fluid comes from the steering circuit. Whenever high pressure is required for the operation of the brake booster, the steering circuit is closed, thereby getting enough high-pressure fluid to the brake circuit. This has the drawback of possible steering loss during brake applications. Secondly, in some of the currently available hydraulic boosters, because of the high ratio of input to output travel, there is a need for arresting the extra travel during manual operations. This requires a special complicated travel limiter assembly. Thirdly, in the currently available hydraulic boosters, the input rod and the trigger mechanism are in two different axes, requiring complicated trigger mechanisms. Fourthly, in the currently available hydraulic boosters, the input-output relationship depends on the input ramp rate. The performance of these boosters is therefore ramp rate sensitive. Also, the currently available boosters tend to give less output at high ramp rates compared to lower ramp rates. This has the drawback of brake not being effective at high ramp rates. It is indeed desirable, considering the wide operating range of the vehicle, to have a booster that gives consistent performance. Fifthly, in the currently available hydraulic boosters, the accumulator comes into force only during fail-safe mode. The trigger mechanism for the fail-safe mode is quite complicated and involves very intricate machining.

There exists a need for a hydraulic brake booster capable of overcoming these technical aspects to maximize output pressure and enhance overall performance.

OBJECTIVES

The objective of the present invention is to have optimum operating threshold for an efficient braking system on any given hydraulic pressure of a hydraulic power source.

Another objective of the present invention is to have a simple configuration of operation that avoids the steering loss during certain operating modes.

Another objective of the present invention is to have both the trigger mechanism and the input road along the same axes, so that it provides a simplified mechanical linkage.

Another objective of this invention is to provide stable and improved output even at higher ramp rate.

Yet another objective of the present invention is to provide improved booster input rod return time

SUMMARY

In view of the above circumstances, the present invention has an object to provide a vehicle braking system that has optimum operating threshold on any given hydraulic pressure of a hydraulic power source. To achieve the above object, according to a first feature of the present invention, there is provided a vehicle braking system comprising: a hydraulic booster which has a control piston for achieving a balance between reaction force generated by hydraulic pressure of a boosted hydraulic pressure chamber capable of generating boosted hydraulic pressure to be applied to wheel brakes and brake operating input from a brake operating member, and which applies output hydraulic pressure of a hydraulic power source to the boosted hydraulic pressure chamber after regulating the output hydraulic pressure as the control piston moves axially.

In the preferred mode according to the first feature of the present invention, when the pedal rod moves forward while compressing the elastic body in the axial direction in response to operation of the brake by the brake operating member, since the outer circumference of the input rod spring bends under the axial compression, bringing the input rod spring into resilient contact with the inner circumference of the output rod, the brake operating member must be operated with such an operating force that overcomes the sum of resilient force of the input rod spring and frictional force between the input rod spring and output rod.

On the other hand, any additional movement of the input rod lifts the ball and allows pressurized fluid into the boost chamber from the accumulator, and thus reduces the driver's burden.

In the preferred mode according to the second feature of the present invention, in addition to the arrangement of the first feature, the pressurized fluid always passes through the accumulator.

In the preferred mode according to the third feature of the present invention, in addition to the arrangement of the first feature, the system further consists of a housing shared by the new control valve assembly and the hydraulic booster. This configuration makes it possible to put together the hydraulic booster and the control valve assembly compactly.

In the preferred mode according to the fourth feature of the present invention, in addition to the arrangement of the third feature, the boost chamber volume is much smaller than that in the conventional hydraulic booster. This configuration makes it possible to increase the pressure build up rate as compared to the conventional hydraulic booster and also put together the hydraulic booster and the master cylinder compactly.

In the preferred mode according to the fifth feature of the present invention, in addition to the arrangement of the fourth feature, the boost piston and trigger mechanism location have the same axis unlike the conventional hydraulic booster that has two different axes for the two. This configuration makes it possible to maintain a simple and compact construction.

In the preferred mode according to the sixth feature of the present invention, in addition to the arrangement of the first feature, there is no travel limiter since travel over knee point is 0.6 mm (max) and there is no multiplication of force since input rod overcomes the input rod spring load and makes physical contact with boost piston to give 1:1 ratio. This configuration makes it possible to avoid complicated travel limiter mechanism.

In the preferred mode according to the seventh feature of the present invention, in addition to the arrangement of the first feature, the spool valve and the pedal rod constitute a single unit and there is constant presence of pressurized fluid in the accumulator, unlike the conventional hydraulic booster where the two are separate units.

In the preferred mode according to the eighth feature of the present invention, in addition to the arrangement of the seventh feature, there is no separate fail-safe mechanism due to the constant presence of pressurized fluid in the accumulator. This configuration makes it possible to avoid complicated trigger mechanism.

In the preferred mode according to the ninth feature of the present invention, in addition to the arrangement of the first feature, a gap is always maintained between the input rod and the output rod. This configuration makes it possible to eliminate uneasiness in braking in the fail-safe mode.

In the preferred mode according to the tenth feature of the present invention, in addition to the arrangement of the first feature the accumulator will be charged as soon as the pump runs, unlike the conventional hydraulic booster which requires one braking or steering application to charge the accumulator. This configuration makes it possible to eliminate a feel of an idle stroke during charging the accumulator.

The above and other objects, features, and advantages of the present invention will become readily apparent from the following detailed description of the preferred embodiments thereof taken in conjunction with the accompanying drawings. Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

U.S. Pat. No. 4,655,512 discloses a brake system having a master cylinder including main pistons, a brake booster for displacing the main pistons a brake valve for controlling the brake booster and a pressure supply device. The brake booster has a booster cylinder and a booster piston which is displaceable into the booster cylinder. The booster piston divides a booster chamber from an auxiliary chamber, which is located between the booster piston and the master cylinder. A first valve assembly and a second valve assembly are provided. The second valve assembly is located between the pressure supply device and the brake valve as well as a connection associated with the booster chamber. The first valve assembly is intended for relieving pressure in the booster chamber in favor of a return line or to join it with the pressure supply device. In the anti-skid mode, pressure in the booster chamber is initially reduced by means of the second valve assembly. This is effected by blocking the inflow of pressure medium to the brake valve and by relieving pressure in the booster chamber. If the drop in brake pressure attainable thereby should be inadequate, then by means of the first valve assembly, pressure medium is directed out of the pressure supply device into the auxiliary chamber. This pressure displaces the booster piston toward its initial position. As a result, a pressure drop down to zero is possible, no matter how severely a brake pedal coupled with the brake valve is depressed.

U.S. Pat. No. 4,732,429 discloses a hydraulic brake system with slip control comprising a master cylinder pressurizable by a hydraulic power booster. A booster sleeve is provided which annularly encloses the booster piston, and which is slidably accommodated in the booster housing. The sleeve's end face directed towards the pressure chamber of the booster is applied by the pressure in the pressure chamber, while an annular chamber filled with pressure medium and connected to a brake circuit is constituted between the booster sleeve with its head portion and the bore in the booster housing. The booster sleeve is coupled to the booster piston by way of a circlip such that, on movement of the booster piston in the direction of brake actuation, the booster sleeve and the booster piston will displace uniformly. On failure of the booster and displacement of the booster piston exclusively by way of the brake pedal, the booster sleeve will remain in its initial position which brings about an abrupt change in ratio.

United States Patent No. US2005121973 discloses a hydraulic booster which applies output hydraulic pressure of a hydraulic power source to a boosted hydraulic pressure chamber after regulating the output hydraulic pressure as a control piston operates to balance reaction force generated by hydraulic pressure of the boosted hydraulic pressure chamber with brake operating input; and a brake stroke simulator installed between the brake operating member and the control piston in order for a driver to feel operating strokes of the brake operating member. The brake stroke simulator has: an input member axially slidably housed in the control piston of a cylindrical shape and linked to the brake operating member; and an elastic body interposed between the input member and the control piston. The elastic body is formed into a tubular shape so as to come into resilient contact with an inner circumference of the control piston by expanding its diameter under the action of axial compressive force generated by forward movement of the input member. Consequently, the brake stroke simulator allows large hysteresis width in relationship between brake operating stroke and operating load.

U.S. Pat. No. 5,715,680 discloses a hydraulic power booster for a brake apply system includes a mechanically actuated hydraulic booster of compact design that can be integrated in line with a conventional type master cylinder. Additionally, a combination of twin mechanically actuated check valves is arranged to provide a structure with essentially no leakage when the hydraulic booster is at rest and when the hydraulic booster is at poise. A mechanically actuated check valve is normally held open and is positioned in a passageway between the power piston and a fluid reservoir. This check valve is substantially, immediately closed upon the application of force to the brake pedal. Another mechanically actuated check valve is provided in a passageway between the hydraulic power supply and the power piston. This check valve is mechanically opened to supply a selected amount of pressurized fluid to the power piston which generates a selected amount of vehicle braking in response to actuation of the brake pedal.

Indian Patent No. IN190626 discloses a control valve for controlling the pressurization of a power chamber of the booster comprises a spool working in a bore in a boost piston. The spool carries longitudinal spaced radial seals, a first one of the seals being disposed so as to prevent fluid from a radial high pressure supply port entering the power chamber through the spool at least when the booster is in an inoperative position. Movement of the spool in a forward operating direction, in response to an input force, causes the first one of the seals to uncover the port so that fluid can enter the power chamber through the spool. The other seal is adapted to uncover a radial return port connected to a reservoir when the input force is released.

Unlike these conventional braking systems a brake system in accordance with this invention has the advantage over the prior art in that it possesses inventive features detailed above and claimed at a later stage.

DESCRIPTION OF DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A hydraulic brake booster system according to an embodiment of the present invention will now be described hereinafter with reference to FIGS. 1 to 10.

Figure 1:
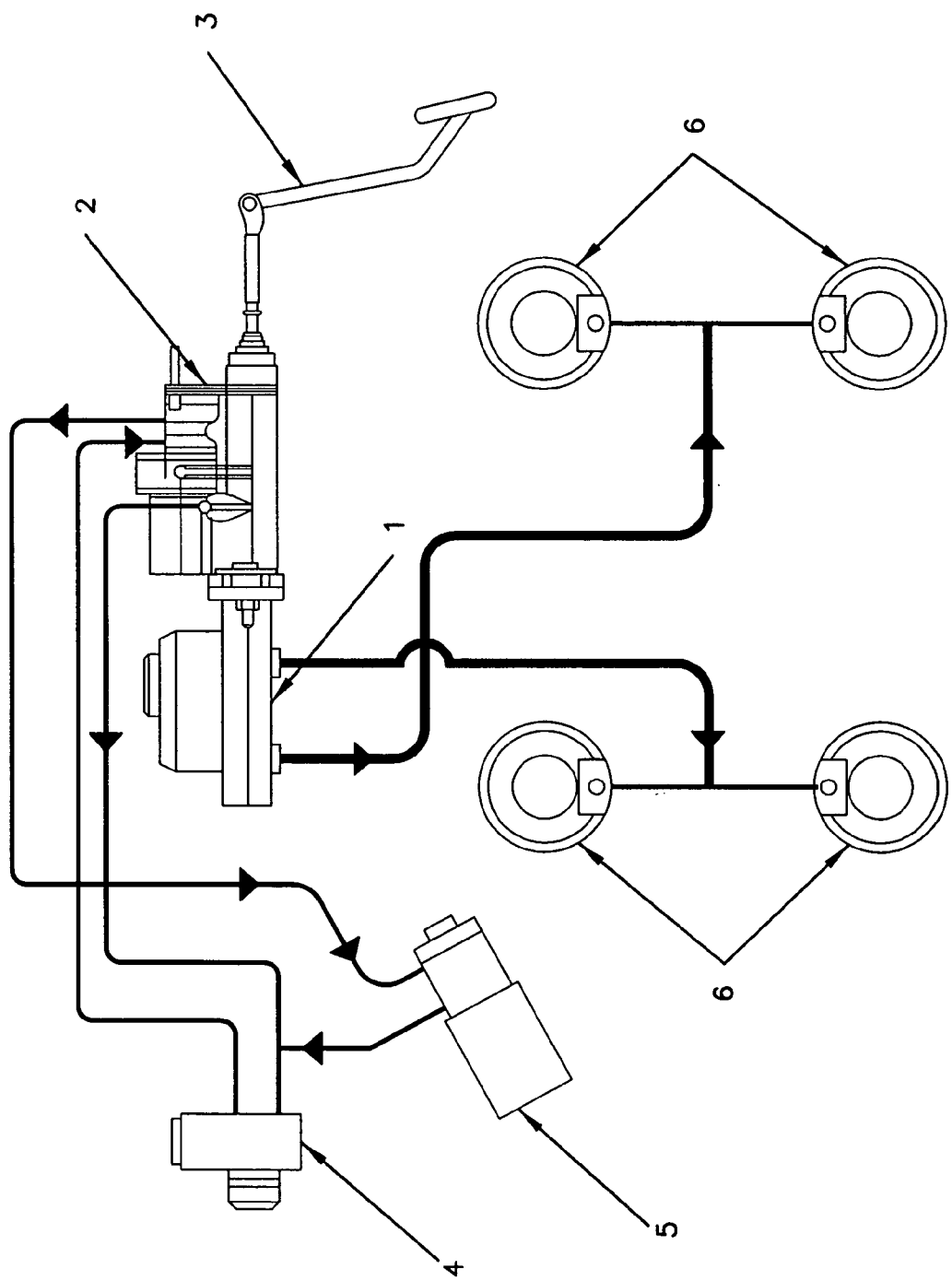
FIG. 1 is a schematic illustration of the brake system with a hydraulic brake booster made according to the principals of the present invention.

The first exemplary embodiment of the brake system shown in FIG. 1 has a master cylinder 1, a hydraulic brake booster 2, a brake pedal 3, a pump & reservoir 4, a steering gear 5, and front and rear brakes 6, which are of a design known in the prior art. A hydraulic brake booster 2 for motor vehicles has a brake cylinder 1 that can be actuated especially by a brake pedal 3, a reservoir of brake fluid 4, a braking means that are coupled to at least one vehicle wheel 6 and can be linked to the brake cylinder 1, a hydraulic pump 4 that supplies pressurized fluid to an accumulator to provide brake fluid under pressure in a controlled manner to the braking means through a control valve arrangement.

As shown in FIG. 1, an input portion of a brake booster 2 is connected a master cylinder 1 by the output rod driven by a brake pedal 3. A pump and reservoir 4 is connected to the master cylinder 1.

Figure 2:
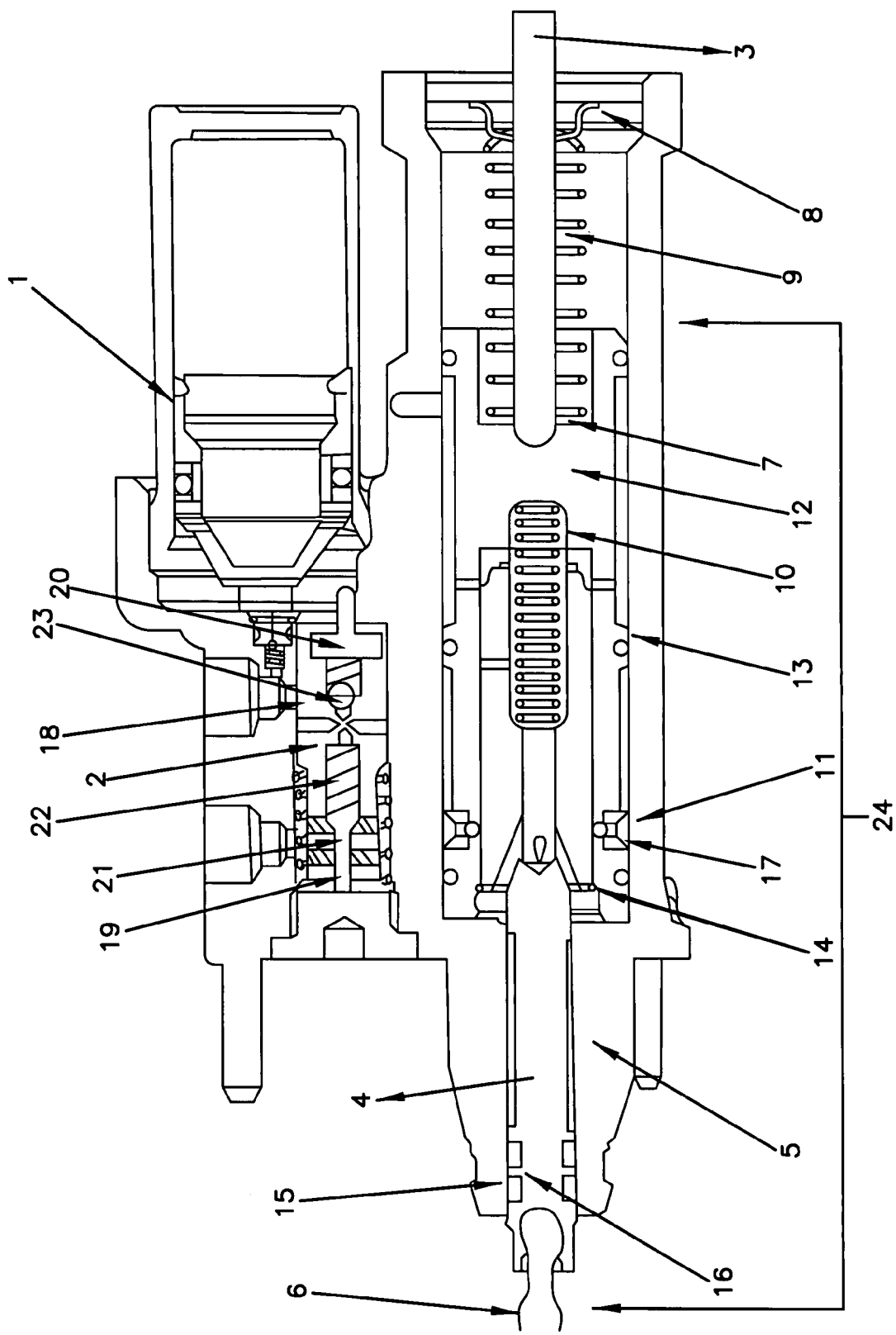
FIG. 2 is a longitudinal section through an assembled hydraulic booster.

The brake booster assembly illustrated in FIG. 2 comprises of an accumulator assembly 1, a control valve assembly 2, output rod 3, input rod 4, pedal rod 6, spacer 7, retainer assy 8, return spring 9, input rod spring 10, boost piston ball 11, boost piston 12, boost piston seal 13, circlip 14, input rod seals 15, all encased in a housing 5. Total number of parts in the brake booster assembly illustrated in FIG. 2 is 53.

At the commencement of the rest mode the input rod 4 and boost piston 12 are in home position with an initial axial gap of 2.5 mm. Pressure inside the boost chamber is at atmospheric level since it is opened to outlet port. As soon as the engine is started the accumulator 1 is charged by the control valve mechanism to the predetermined set pressure. Once the predetermined set pressure is achieved, pressurized fluid is trapped inside the accumulator by the control valve. This directs the pump flow to the steering port. The accumulator piston 1 moves to the far end of the cylinder. The boost piston ball 11 is closed during this mode in order to prevent pressurized fluid entry into the boost chamber.

On application of pressure to the pedal rod 6, the input rod 4 moves forward for a minimum distance and closes the outlet port. The input rod 4 moves further to lift the boost piston ball 11 and allow pressurized fluid to flow from the accumulator 1 into the boost chamber and is accumulated behind the boost piston 12 where it develops boost force. The pump immediately charges pressure loss in the accumulator 1 and equilibrium is maintained.

During hold mode the pedal rod 6 retains the same position and the boost piston 12 axially moves towards the right due to the pressure present in the boost cavity developed during the apply mode. The output rod 3 remains closed and the boost piston ball 11 retains its position in the apply mode. This movement activates metal to metal sealing between boost piston 12 and the input rod 4, and stops the entry of additional pressurized fluid into the boost chamber thus maintaining certain pre determined pressure inside the boost chamber. Pressurized fluid is available to steering even during hold mode.

Usually in the fail-safe mode when there is no pump pressure, the input rod 4 movement makes the actuator move and press the dump valve plunger. The dump valve dumps pressurized fluid from the accumulator 1 into boost cavity thereby developing boost force.

However, in the present invention there is no separate fail-safe mechanism due to the constant presence of pressurized fluid in the accumulator. During the fail safe mode the working principle is the same as that in the normal apply mode and hold mode. However any loss in pressure maintained in the accumulator 1 cannot be compensated due to non-availability of a steering pump. A minimum gap is always maintained between the input rod 4 and the output rod 3 in order to eliminate uneasiness in braking in the fail safe mode. Number of fail safe brake applications possible are more than ten, unlike the conventional hydraulic brake booster where only 5 fail safe brake applications are possible.

During the manual mode there is a failure in the working of both the pump and the accumulator 1. During the manual mode, the input rod 4 overcomes the input rod spring load and comes into contact with the boost piston 12 to give a 1:1 ratio. This results in a smooth switchover to the manual mode unlike the conventional hydraulic boosters. There is no pressurized fluid in the boost chamber.

The present arrangement of trigger mechanism and boost piston 12 wherein they have the same axis helps to achieve a simple and compact construction. The need for complex structures such as the travel limiter and dump valve are eliminated, unlike the conventional hydraulic booster assembly. Further the accumulator 1 is charged as soon as the pump is started and any pressure loss in accumulator 1 is compensated simultaneously except during fail-safe mode. Further the spool valve and the pedal rod 6 constitute a single unit and there is constant presence of pressurized fluid in the accumulator 1, unlike the conventional hydraulic booster where the two are separate units.

Figure 3:
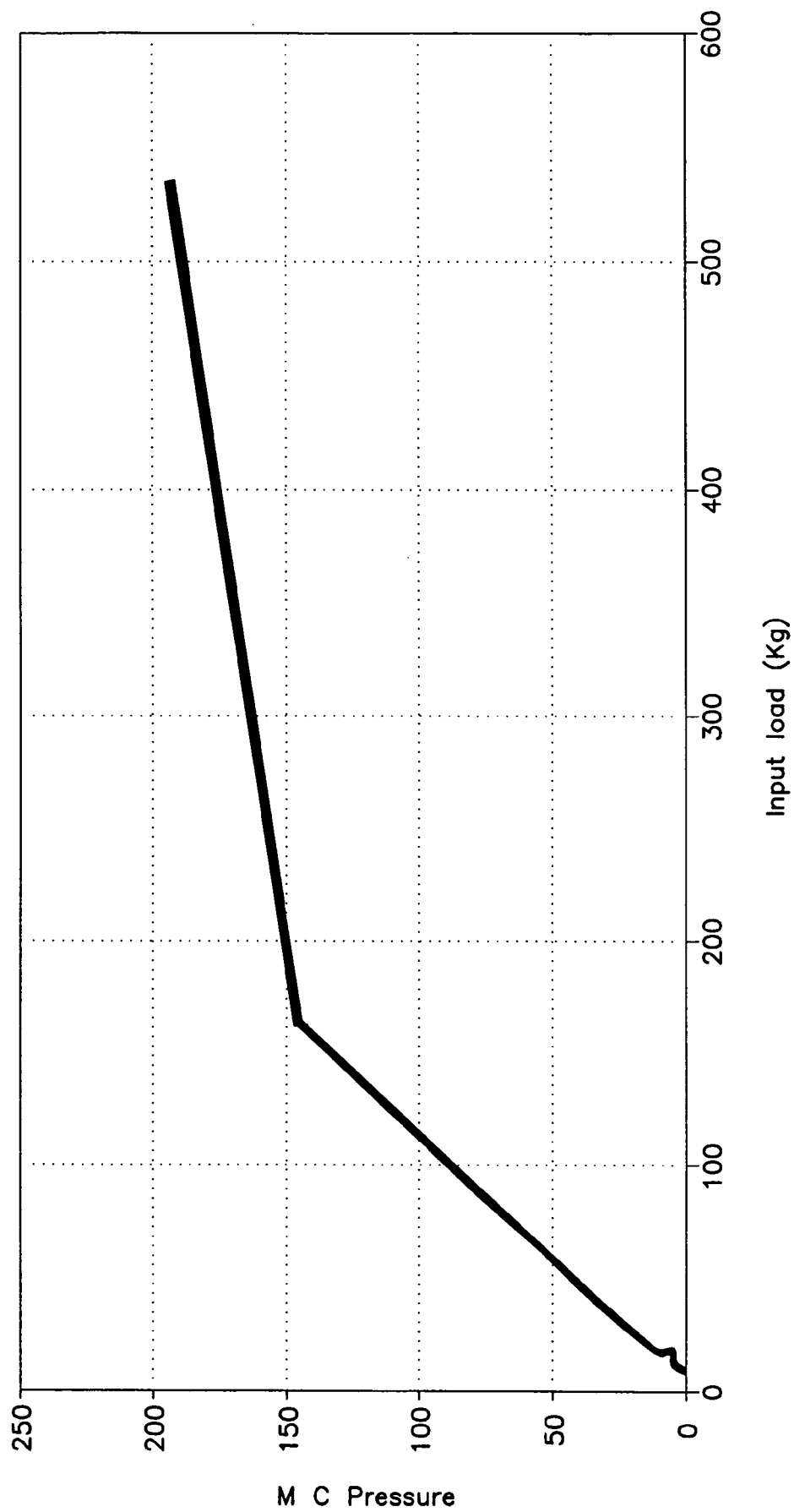
FIG. 3 is a graphical depiction of the performance curve of the present invention at ramp rate 1.

The graph in FIG. 3 illustrates the performance curve of the present invention at ramp rate 1. The knee point pressure (Bar)/load (Kg) at this stage is 145/167.

Figure 4:
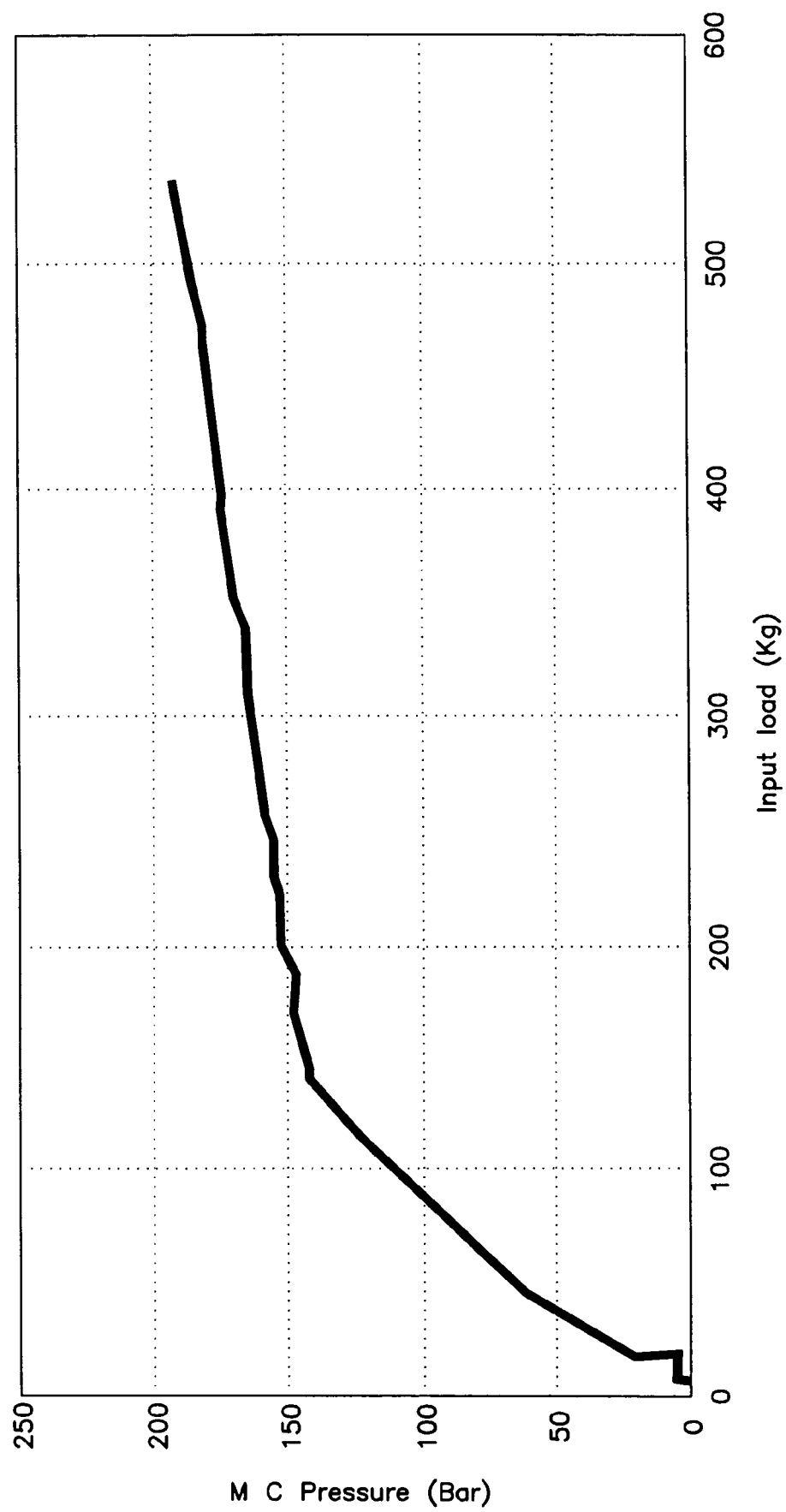
FIG. 4 is a graphical depiction of the performance curve of the present invention at ramp rate 2.

The graph in FIG. 4 illustrates the performance curve of the present invention at ramp rate 2. The knee point pressure (Bar)/load (Kg) at this stage is 142.8/142.3.

Figure 5:
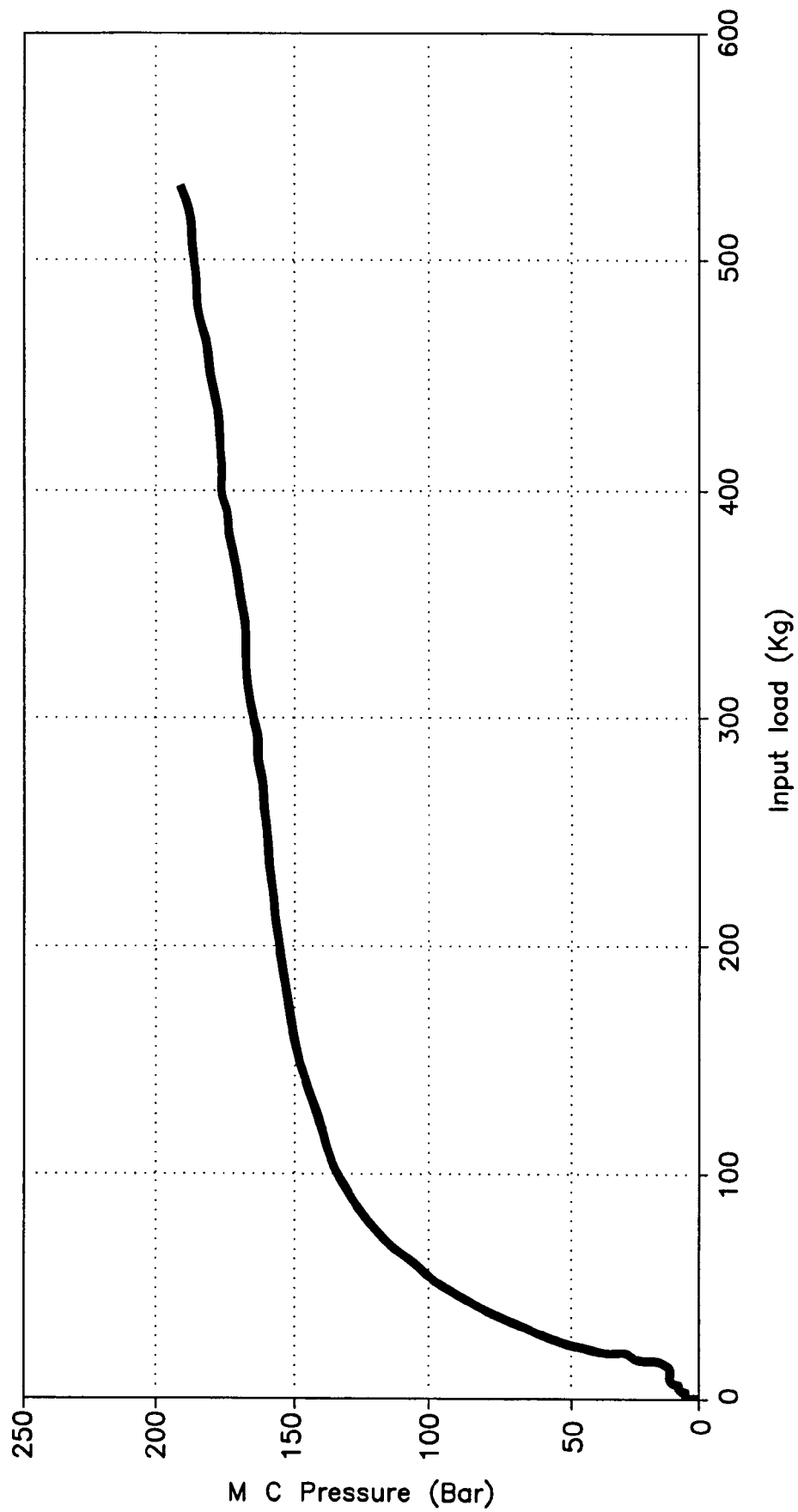
FIG. 5 is a graphical depiction of the performance curve of the present invention at ramp rate 3.

The graph in FIG. 5 illustrates the performance curve of the present invention at ramp rate 3. The knee point pressure (Bar)/load (Kg) at this stage is 136/105. This is much higher than that in the conventional hydraulic brake booster.

Figure 6:
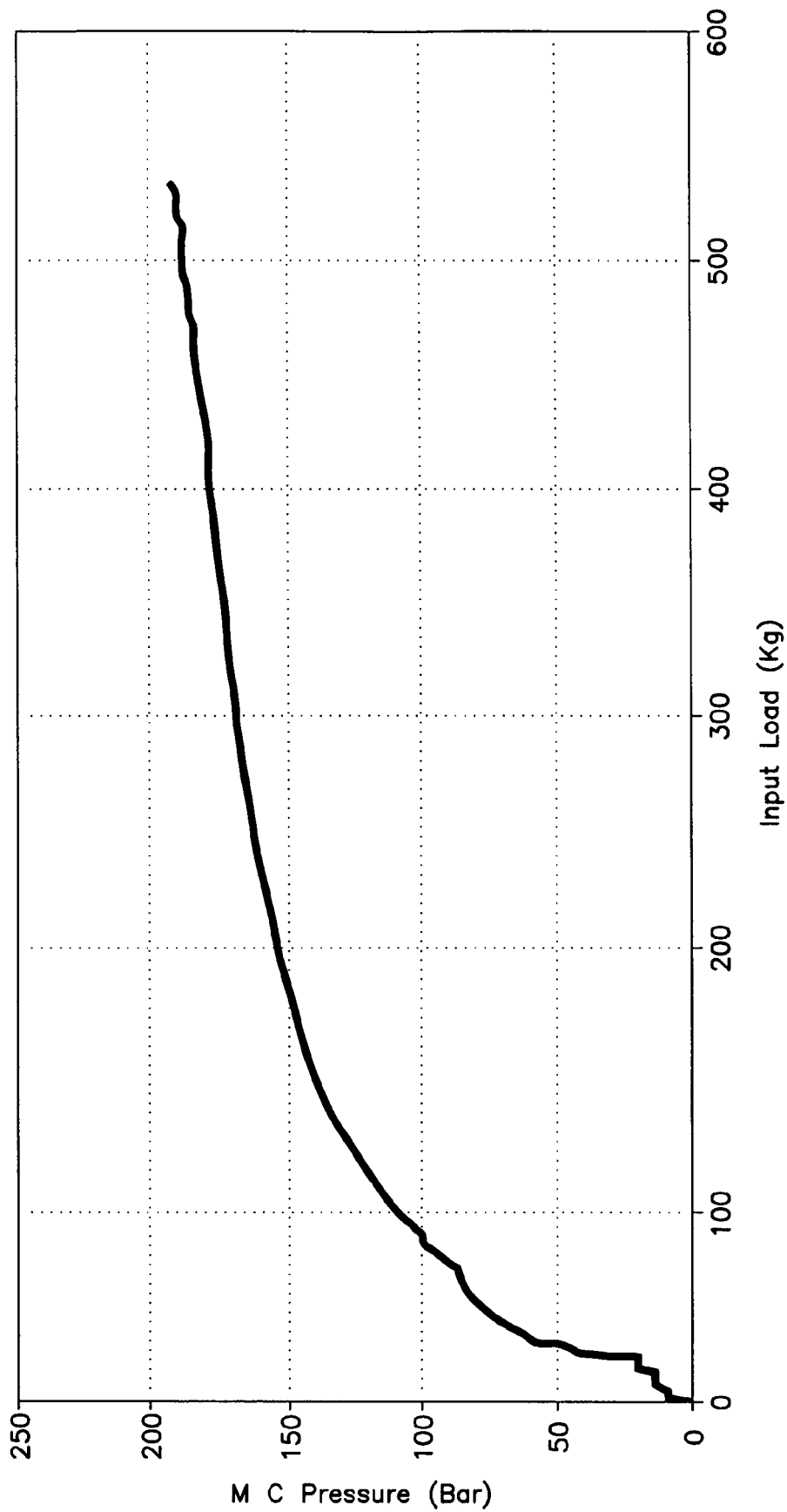
FIG. 6 is a graphical depiction of the performance curve of the present invention at ramp rate 4.

The graph in FIG. 6 illustrates the performance curve of the present invention at ramp rate 4. The knee point pressure (Bar)/load (Kg) at this stage is 132/123. This is much higher than that in the conventional hydraulic brake booster.

Figure 7:
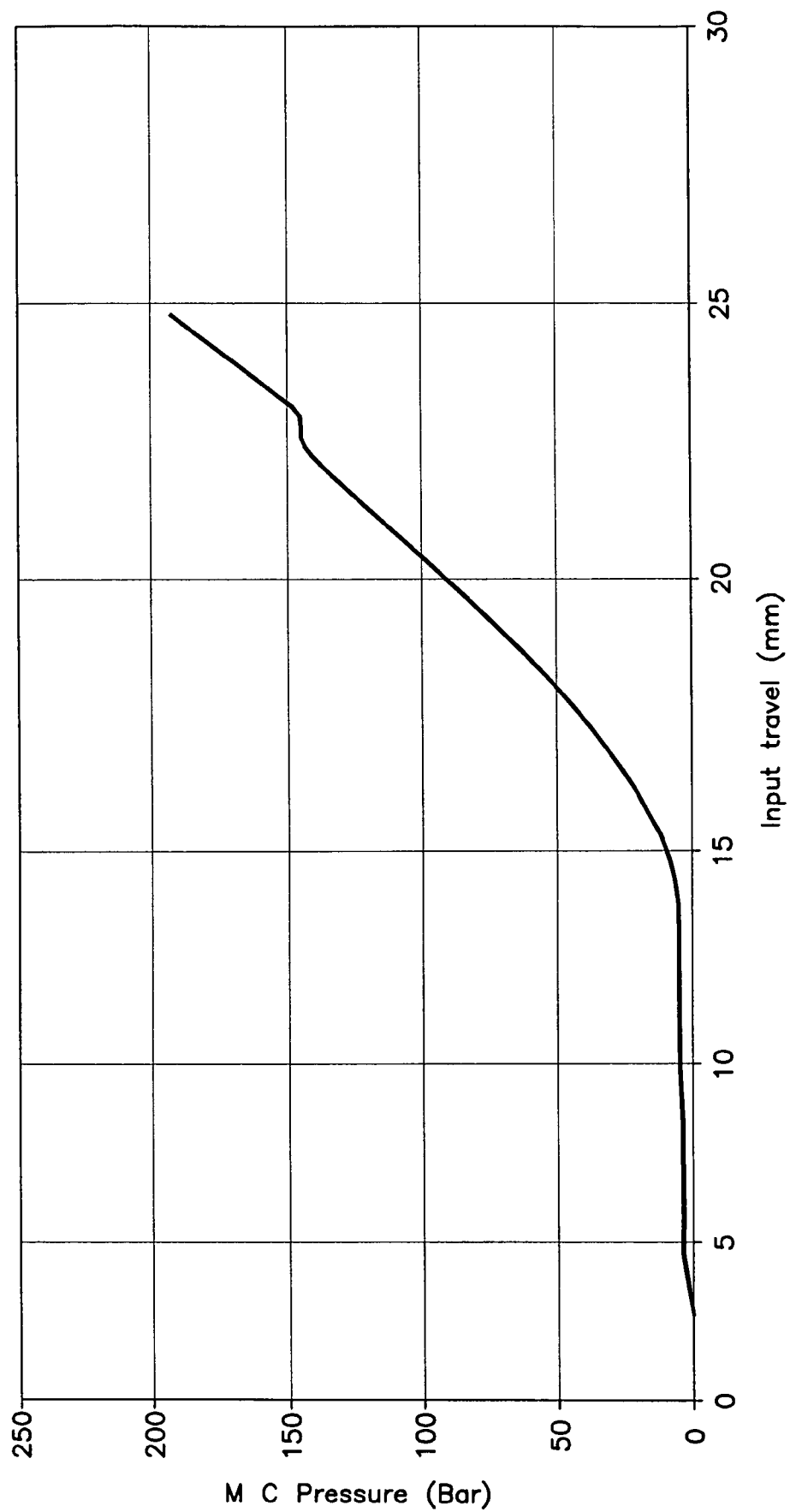
FIG. 7 is a graphical depiction of the travel rate of the present invention at ramp rate 1.

The graph in FIG. 7 illustrates the travel of the present invention at ramp rate 1. Travel over knee point is 0.6 mm, which is less than travel over knee point of 2.9 mm in the conventional hydraulic brake booster. Input rod 4 travel is greater than that in a conventional hydraulic brake booster.

Figure 8:
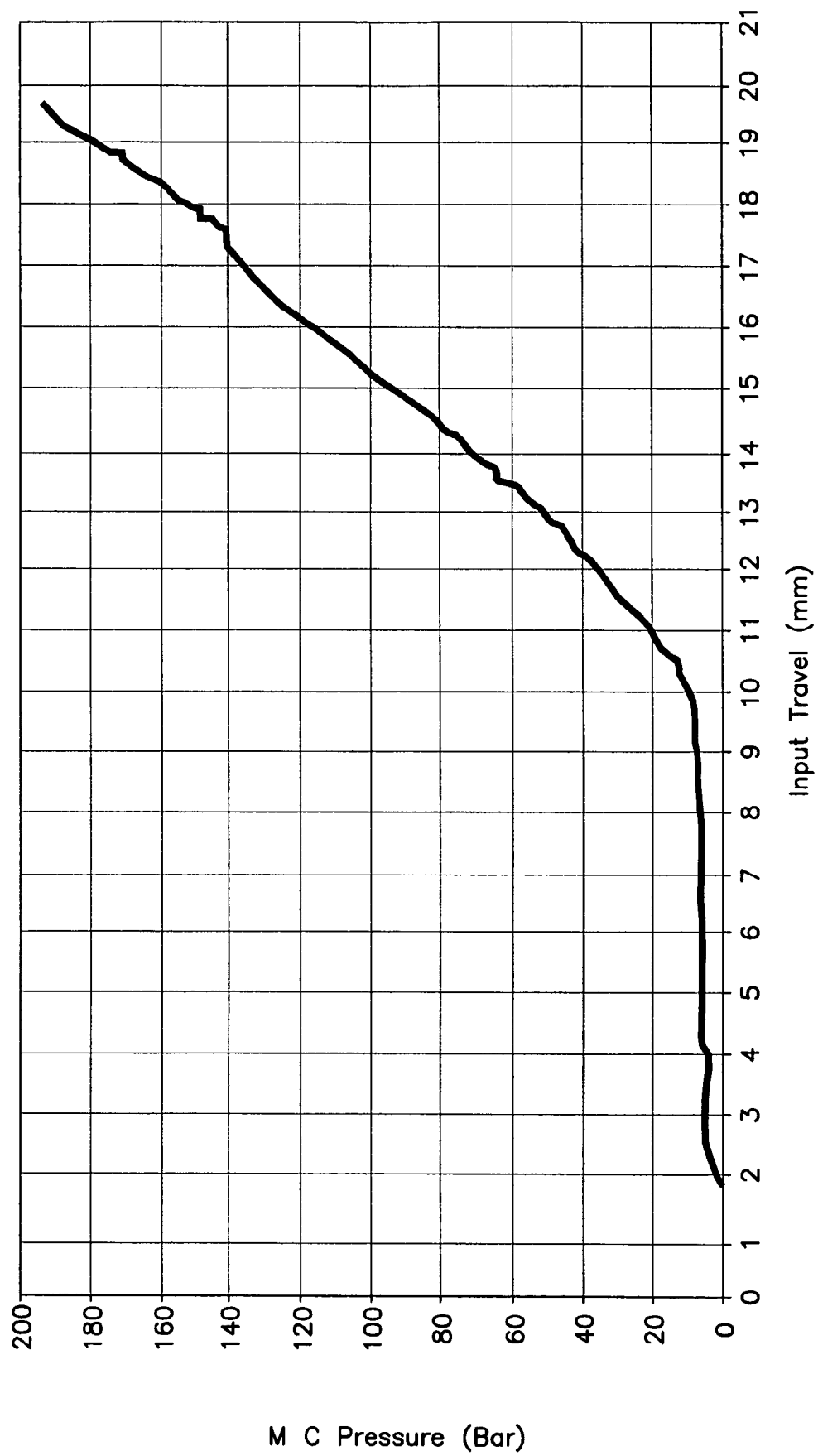
FIG. 8 is a graphical depiction of the travel rate of the present invention at ramp rate 2.

The graph in FIG. 8 illustrates the travel of the present invention at ramp rate 2. Travel over knee point is not visible in the present invention, unlike the conventional hydraulic brake booster where travel over knee point is 0.63 mm. Input rod 4 travel is greater than that in a conventional hydraulic brake booster.

Figure 9:
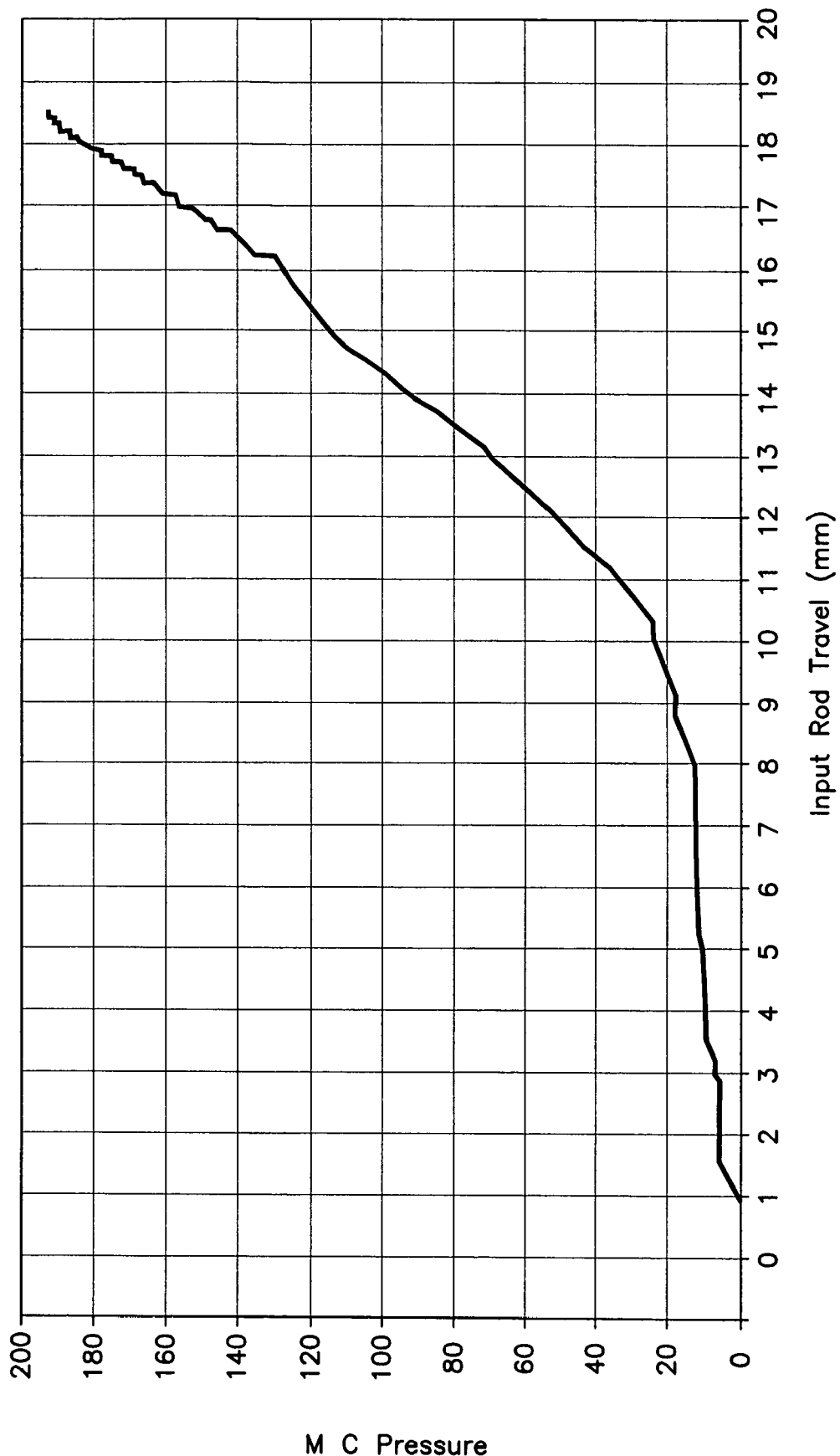
FIG. 9 is a graphical depiction of the travel rate of the present invention at ramp rate 3.

The graph in FIG. 9 illustrates the travel of the present invention at ramp rate 3. Input rod 4 travel is greater than that in a conventional hydraulic brake booster.

Figure 10:
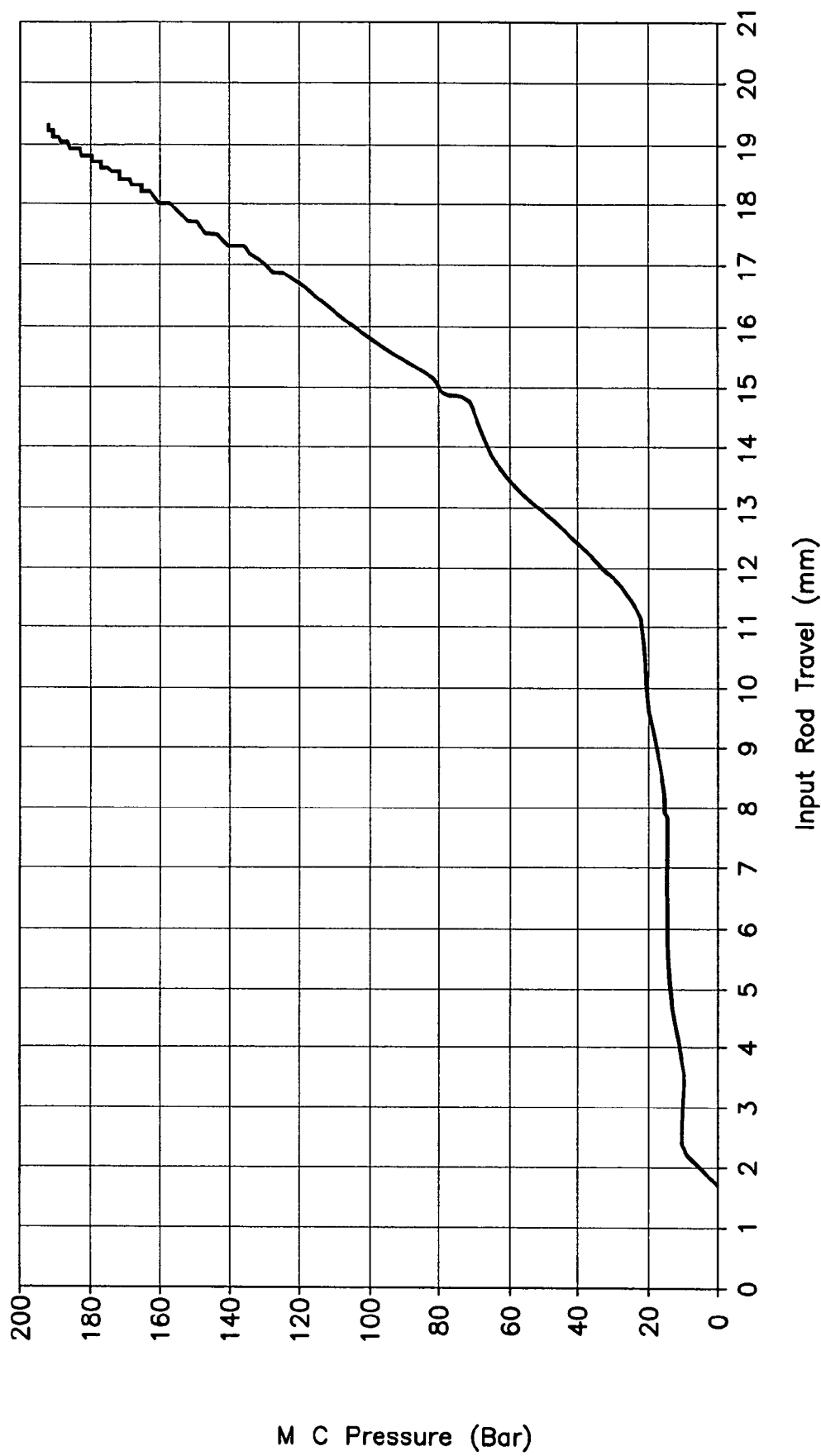
FIG. 10 is a graphical depiction of the travel rate of the present invention at ramp rate 4.

The graph in FIG. 10 illustrates the travel of the present invention at ramp rate 4. Input rod 4 travel is lesser than that in a conventional hydraulic brake booster.

The ramp ratio is efficiently improved and overall return time of the pedal rod 6 is ≦0.9 secs, which is faster than the corresponding return time of >2 secs in the conventional hydraulic brake booster. This can be attributed to the improved pressure exhaust mechanism in the present invention. The input rod 4 travels more, however the knee point is attained faster. The input travel and output travel in the present invention are the same, unlike the conventional hydraulic brake booster where input travel in shorter when compared to output travel. As the ramp rate increases the flow of pressurized fluid into the boost chamber is increased, unlike the conventional hydraulic brake booster where increase of ramp rate witnesses decreased flow of pressurized fluid into the boost chamber. The need for lever mechanism is also eliminated. The overall structure of the booster assembly is simplified and ramp ratio is efficiently improved.

While the invention has been described in connection with specific embodiments thereof, it will be understood that it is capable of further modifications and this application is intended to cover any variations, uses, or adaptations of the invention following, in general, the principles of the invention and including such departures from the present disclosure come within known or customary practice within the art to which the invention pertains and may be applied to the essential features hereinbefore set forth.

What is claimed is:

1. An hydraulic brake booster for a automobile hydraulic system comprising a boost cylinder, a boost piston and a boost chamber, wherein the boost piston works in a bore in a body, the boost piston being adapted to apply an output force to an output rod in response to a pressure applied to the boost chamber by a control valve, wherein the control valve is in turn responsive to an input force from an input rod, the input rod being characterized in that movement of the input rod in a forward operating direction up to a prescribed point so as to prevent fluid from a radial high pressure supply port from entering the boost chamber at least when the booster is in an inoperative position, wherein the inoperative position comprises the supply port securely covered by a boost piston ball, such that any added movement of the input rod in a forward operating direction lowers the pressure in the boost chamber which enable the external pressure of the pressurized fluid to lift the boost piston ball and uncover the supply port so as to allow pressurized fluid into the boost chamber from an accumulator.

2. An hydraulic brake booster according to claim 1, wherein the boost piston ball substantially covers the supply port at least when the booster is in the inoperative position as there exists lower pressure in the boost chamber than that of the pressurized fluid in the accumulator.

3. An hydraulic brake booster according to claim 1, wherein the boost piston ball is engaged and operates to uncover the supply port in the accumulator when the input force is relieved as it lowers the pressure in the boost chamber which enable the external pressure of the pressurized fluid to lift the boost piston ball and uncover the supply port.

4. An hydraulic brake booster according to claim 3, wherein the accumulator contains high pressure fluid at all times, through the control valve of the a control unit and prevention of pressure leak by the boost piston ball.

5. An hydraulic brake booster according to claim 1, wherein the control valve assembly and the hydraulic booster are situated in a single housing.

6. An hydraulic brake booster according to claim 1, wherein the input rod (8), boost piston (2) and output rod (19) function as a single unit to apply force on and generate pressure in a master cylinder, due to the consumption of all the pressurized fluid from the accumulator for power assisted brake application and the resultant physical contact between the input rod and the boost piston.

7. An hydraulic brake booster according to claim 1, wherein the accumulator is directly charged by the pump through the control valve mechanism consisting of a valve body, a plunger valve, a plunger rod, a spacer, a spring, and a ball.

8. An hydraulic brake booster according to claim 1, further comprising a spool valve and a trigger mechanism, wherein the boost piston and trigger mechanism are situated on a single axis and there is no need for a link to connect the boost piston and spool valve.

9. An hydraulic brake booster according to claim 1, wherein there is quick exhaustion of pressurized fluid upon brake release due to rapid opening of the output rod in the high boost pressure build up rate.

* * * * *